United States Patent
Anderson et al.

(10) Patent No.: US 10,496,972 B1
(45) Date of Patent: Dec. 3, 2019

(54) METHODS AND SYSTEMS FOR VIRTUAL SECURED TRANSACTIONS

(71) Applicant: VCE Company, LLC, Richardson, TX (US)

(72) Inventors: Barbara J. Anderson, Allen, TX (US); Marion L. Johnson, III, Silver Springs, FL (US)

(73) Assignee: VCE IP Holding Company LLC, Richardson, TX (US)

( * ) Notice: Subject to any disclaimer, the term of this patent is extended or adjusted under 35 U.S.C. 154(b) by 1106 days.

(21) Appl. No.: 14/481,369

(22) Filed: Sep. 9, 2014

(51) Int. Cl.
*G06Q 20/20* (2012.01)
*G06Q 20/38* (2012.01)
*G06Q 20/40* (2012.01)

(52) U.S. Cl.
CPC ......... *G06Q 20/202* (2013.01); *G06Q 20/382* (2013.01); *G06Q 20/401* (2013.01); *G06Q 2220/00* (2013.01)

(58) Field of Classification Search
CPC .............. G06Q 10/087; G06Q 20/206; G06Q 30/0625; G06Q 20/363; G06Q 20/401; G06Q 30/0254; G06Q 20/1235
See application file for complete search history.

(56) References Cited

U.S. PATENT DOCUMENTS

| 8,949,969 B2* | 2/2015 | Newman ............... H04L 63/126 726/15 |
| 2002/0071557 A1* | 6/2002 | Nguyen .................. G07F 17/32 380/251 |
| 2002/0174031 A1* | 11/2002 | Weiss ..................... G06Q 20/04 705/26.1 |
| 2011/0013637 A1* | 1/2011 | Xue ..................... H04L 12/4679 370/395.5 |
| 2013/0166446 A1* | 6/2013 | Pujari .................... G06Q 20/08 705/44 |

OTHER PUBLICATIONS

HowStuffWorks, Jeff Tyson & Stephanie Crawford "How VPNs Work" Apr. 14, 2011. HowStuffWorks.com. <http://computer.howstuffworks.com/vpn.htm>.*
PeteNetLive, "Cisco Firewall VPN 'Hair Pinning' Note: Cisco refer to this as a 'Spoke to Spoke VPN'" May 22, 2012. http://www.petenetlive.com/KB/Article/0000040.*

* cited by examiner

Primary Examiner — Johann Y Choo
(74) *Attorney, Agent, or Firm* — Polsinelli PC

(57) ABSTRACT

Implementations of the present disclosure involve an apparatus, device, component, and/or method for a networking component for use in creating a virtual secured point-of-sale (POS) transaction over a network. In one embodiment, the networking component is a virtual router that is located logically between a retailer and a payment processing company for processing a POS transaction. To facilitate the POS transaction, the virtual router communicates with one or more virtual private networks (VPNs) to establish secured communication tunnels over which information and network traffic may be broadcast that prevent unauthorized access to the information from an outside source or third party. In this manner, a secured end-to-end security communication tunnel (including encryption of the transmitted data) may be created over a network from the originating point of sale (retailer) to the payment processing company.

16 Claims, 4 Drawing Sheets

METHODS AND SYSTEMS FOR VIRTUAL SECURED TRANSACTIONS

FIELD OF THE DISCLOSURE

Aspects of the present invention relate to networking devices and, more particularly, aspects of the present invention involve a physical or virtual router for use in creating a virtual secured point-of-sale transaction over a network.

BACKGROUND

Point-of-sale (POS) transactions occur when a customer to a retail business exchanges payment for goods or services. One common form of POS transactions includes the user of a credit card or other electronic forms of payment. A typical POS transaction involves the customer providing information concerning the credit card (such as a credit card number, customer name, expiration date, etc.) to a credit card issuer through a terminal at the retailer location. This information is received and verified by the credit card issuer. If verification occurs, the credit card issuer provides an authentication notice to the retailer verifying the credit card user, thereby completing the POS transaction. As should be appreciated, the information exchanged during the POS transaction may be sensitive to the credit card holder, the credit card issuer, and/or the retailer. Thus, many retailers and credit card issuers have attempted to secure such information exchanges. However, many vulnerabilities to the secured exchange of POS information continue to provide opportunities for the capturing of such information.

SUMMARY

One implementation of the present disclosure may take the form of a method for facilitating a point-of-sale transaction. The method may include the operations of receiving an encrypted purchasing information communication packet at a virtual router from a first virtual private network (VPN) over a first VPN interface, the encrypted purchasing information communication packet comprising customer information obtained at a retailer, transmitting the encrypted purchasing information communication packet to a second VPN over a second VPN interface, the second VPN maintained by a payment processing entity, receiving an encrypted acknowledgement communication packet at the virtual router from the second VPN, the encrypted acknowledgement communication packet comprising an purchase verification related to the customer information, and transmitting the encrypted acknowledgement communication packet to the first VPN over the first VPN interface. In addition, the present disclosure may be embodied as an apparatus or in a non-transitory computer readable media comprising computer executable instructions to perform a method.

DETAILED DESCRIPTION

Implementations of the present disclosure involve an apparatus, device, component, and/or method for a networking component for use in creating a virtual secured point-of-sale (POS) transaction over a network. In one embodiment, the networking component is a virtual router that is located logically between a retailer and a payment processing company for processing a POS transaction between the retailer and the payment processing company. To facilitate the POS transaction, the virtual router communicates with one or more virtual private networks (VPNs) to establish secured communication tunnels over which information and network traffic may be broadcast that prevent unauthorized access to the information from an outside source or third party. Further, the virtual router may be configured to comply with various security rules and procedures of the VPNs to which the virtual router communicates. In this manner, a secured end-to-end security communication tunnel (including encryption of the transmitted data) may be created over a network from the originating point of sale (retailer) to the payment processing company.

Figure 1:
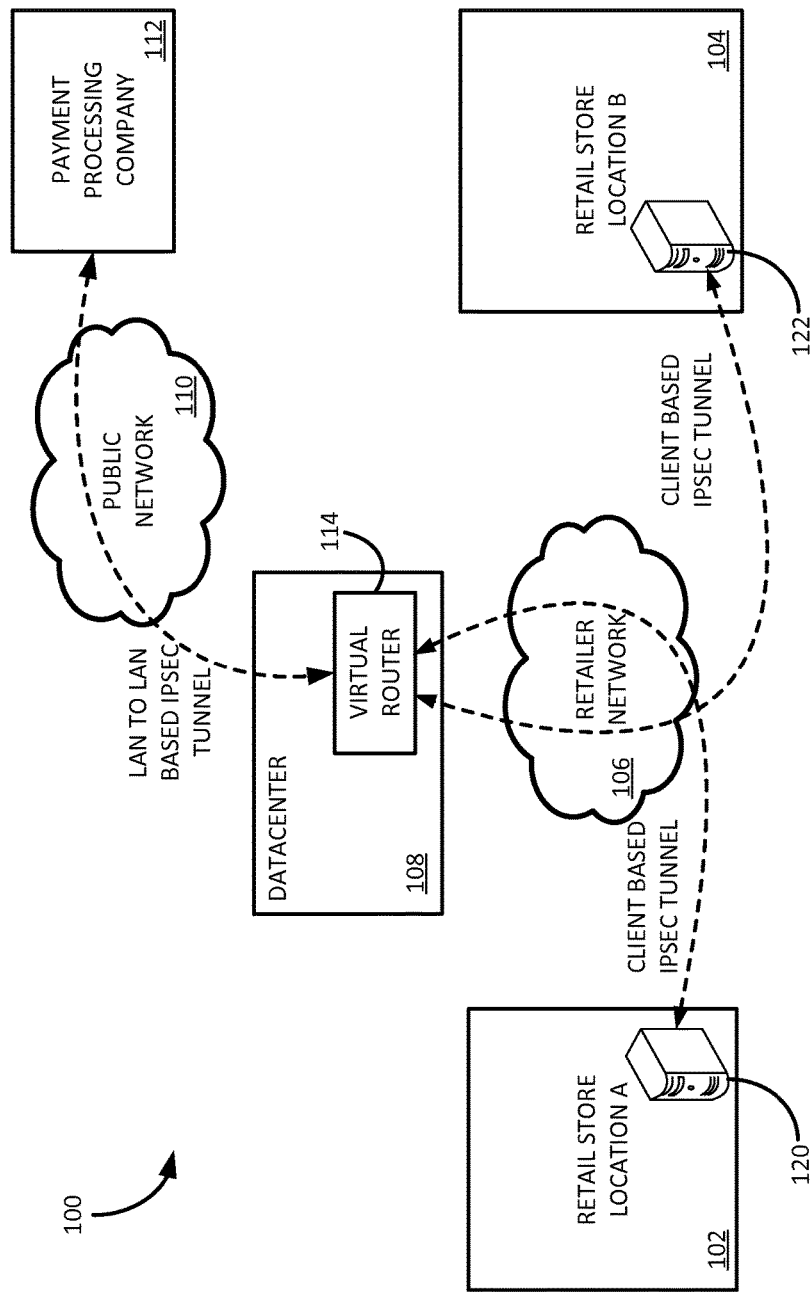
FIG. 1 is a diagram illustrating an example of a networking environment for use in a secured point-of-sale transaction, according to one embodiment of the present disclosure.

FIG. 1 is a diagram illustrating an example of a networking environment 100 for use in a secured point-of-sale transaction, according to one embodiment of the present disclosure. Although the networking environment 100 of FIG. 1 includes several components, it should be appreciated that more or fewer components may be included in the networking environment than shown. For example, either of the networks 106,110 shown may include any number of routers, servers, switches and the like for communicating network traffic. In general, the components of the networking environment 100 shown in FIG. 1 are for illustrative purposes only and do not limit the scope of the present disclosure.

The networking environment 100 includes a retail customer's network and/or networking equipment 102. For example, a retailer may have a store that allows for purchasing of goods and/or services at the store. The retailer may employ a POS-type transaction for purchases, such as a credit card transaction, that utilizes any number of electronic and networking components to facilitate the transaction. For example, the retailer may include a credit card reader for receiving information from a customer's credit card. The credit card reader may be in communication with the retailer networking equipment 120 to transmit the information to a retailer network 106 once the information is obtained. In one embodiment, the retailer store 102 includes a local area network (LAN) maintained by the retailer and configured to communicate with one or more payment processing entities for POS transactions. The retailer LAN 102 may include any number and type of networking components 120, such as servers, routers, switches and the like in communication with one or more credit card readers connected to the network. Further still, the retailer LAN 102 may be secure such that access to the information obtained by and transmitted over the LAN is encrypted. The transmission of information over the retailer LAN 102 is discussed in more detail below.

In one particular embodiment, the retailer LAN 102 is virtualized and operated on a converged infrastructure system configured in a cloud computing environment. A converged infrastructure generally refers to a type of computing infrastructure that packages multiple, heterogeneous computing components into a single, optimized computing platform. Converged infrastructures are often used in the Information Technology ("IT") context in an attempt to centralize, consolidate, and optimize the management of IT computing components and resources. Typical computing components include servers, storage devices, virtualization components, network components, and the like. Additionally, converged infrastructures may include application software for the management, automation, and/or orchestration of pools of computing components. The pooled computing components may be utilized, for example, as a service, at one or more user devices over a network. While some examples disclosed herein reference converged infrastructures, also sometimes referred to as unified computing systems, fabric-based computing systems, and dynamic infrastructures, systems and method described herein may be applied to other computing environments.

In one embodiment of the present disclosure shown in FIG. 1, the retailer may include multiple retailer sites or stores. For example, a second retailer store 104 may be at a separate location then the first retailer store 102, although the stores may be owned and/or operated by the same company. Also, the second retailer store 104 may include the same or similar equipment 122 to facilitate POS-type transactions at the store. Thus, the retailer may include a credit card reader for receiving information from a customer's credit card and a network to transmit the information over the retailer's network 104 once the information is obtained. In one embodiment, the retailer store may include a LAN 104 for communicating with a retailer network 106. The retailer LAN 104 may be secure such that access to the retailer network is limited and the information transmitted over the retailer network may be encrypted. Also, similar to the retailer LAN 102 described above, the second retailer LAN 104 may be virtualized and operated on a converged infrastructure system.

In many retailer instances, the various retailer stores may be connected to a retailer network 106 for transmitting information between the various store locations. In one embodiment, the retailer network 106 may be a wide area network (WAN) that connects to a plurality of retailer stores and allows information to be transmitted between the locations. In addition, the retailer network 106 may be a secure network such that the network may require an authorization to access the retailer network. As part of the security of the network 106, secure communication tunnels may be created between the network and the retailer store LANs 102,104. Further, the retailer network 106 may be connected to an outside or public network (such as the Internet 110) for communication to entities other than the retailer stores. One such entity may be a payment processing company 112 for receiving information for facilitating the POS transactions of the retailer stores.

In one embodiment, the payment processing company 112 or entity may be a credit card processing company. In general, the payment processing company 112 receives POS-based information from one or more retailers or retailer networks 106 and, utilizing that information, confirms a POS transaction occurring at the retailer. In the credit card processing company example, the credit card processing company verifies the identity of a customer attempting to utilize the credit card to make a purchase, verifies an available purchasing value related to the customer, and returns an acknowledgement of the authenticity of the POS transaction back to the retailer for acceptance by the retailer.

The exchange of information between the retailer network 106 and the payment processing company 112 may occur over a network 110. In one embodiment, the network 110 is the Internet. In general, however, any network configured to allow communication between the retailer network 106 and the payment processing company 112 may be utilized to process the POS transaction.

In the example above where a public network 110 is utilized to process the POS transaction, one or more secure communication tunnels through the network may be established between the retailer network 106 and the payment processing company 112. These secure communication tunnels allow for the transmission of communications over the public network 110 such that the communications are not obtainable or understandable by a third party. In one embodiment, such secure connection tunnels through the network 110 utilize a protocol suite for securing Internet Protocol (IP) based communications known as Internet Protocol Security (IPSEC). In general, an IPSEC tunnel secures communications by authenticating and/or encrypting the IP packets of a communication session. This may include protocols for establishing mutual authentication between communication parties as well as negotiating one or more cryptographic keys used during the communication session. IPSEC compliant secure tunnels may be implemented in any network where communications are transmitted between two or more parties to the network. While the disclosure herein describes IPSEC compliant secure tunnels for communicating through the networks, it should be appreciated that any known or hereafter developed protocol for establishing and utilizing secure communication tunnels through a network may be used in conjunction with the present disclosure.

In addition, the networking environment 100 may include a datacenter 108 located virtually between the retailer network 106 and the payment processing company 112. In one embodiment, the datacenter 108 may provide a gateway between the retailer network 106 and a public network 110 through which the payment processing company 112 communicates with the retailer network. In one particular embodiment, the datacenter 108 may include a virtual router 114 that virtually connects to and communicates with the public network 110 and the retailer network 106. As described in more detail below, the virtual router of the datacenter 108 may be utilized to create a secure end-to-end communication tunnel from the retailer store location 102, 104 to the payment processing company 112. In addition to the virtual router, the datacenter 108 may include any number of other networking components, such as servers, switches, gateways, and the like. Also, similar to the networks described above, the datacenter may include a converged infrastructure system that includes the virtual router 114.

Through the networking environment 100 of FIG. 1, a secured end-to-end security communication tunnel (including encryption of the transmitted data) may be created over a network 106,110 from the originating point of sale (retailer) 102,104 to the payment processing company 112. Previously, the communication tunnel utilized for the POS transaction has security vulnerabilities as the communications involved in the POS transaction are transferred from network to network. For example, the interface between the retailer network 106 and the public network 110 often included security vulnerabilities as the communication packets were received at the datacenter 108 and repackaged or encrypted for transmission over the public network. However, through the use of the virtual router 114 at the datacenter 108, a complete end-to-end security communication tunnel from the retailer 102,104 to the payment processing company 112 may be established.

Figure 2:
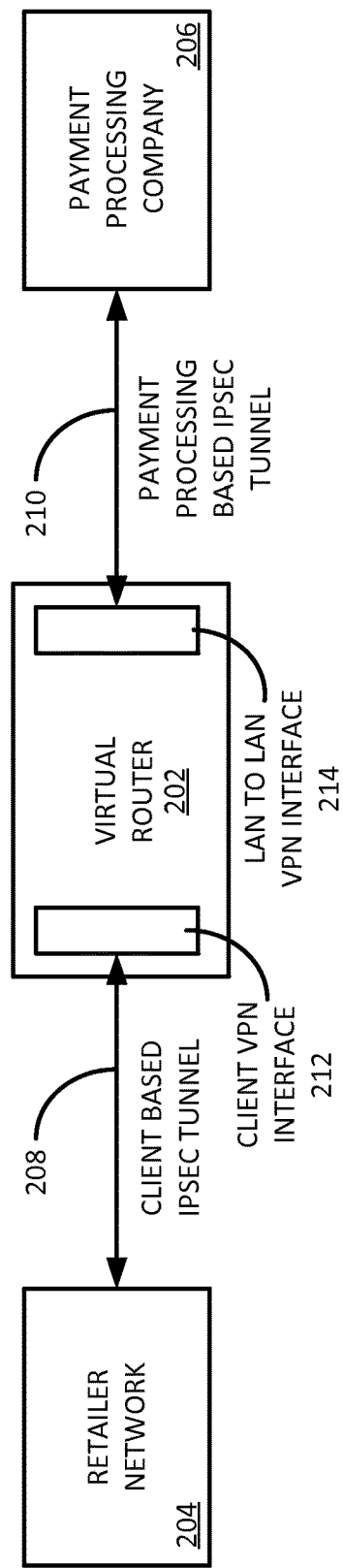
FIG. 2 illustrates a block diagram illustrating an example virtual router for use in secured point-of-sale transaction, according to one embodiment.

FIG. 2 illustrates a block diagram illustrating an example virtual router for use in secured point-of-sale transaction, according to one embodiment. In particular, the virtual router 202 of FIG. 2 may be part of the datacenter 108 of FIG. 1 and may provide a gateway between the retailer network 106 and a public network 110 through which the payment processing company 112 communicates with the retailer network. Further, as explained in more detail below, the virtual router 202 may be configured to communicate with a retailer network-based VPN and the payment processing company-based VPN such that a secure communication tunnel between the parties to a POS transaction is established.

As mentioned, the virtual router 202 provides a gateway between networks for a POS transaction or any other type of communication between the networks. In particular, the virtual router 202 may communicate with a retailer network 204 through a secured communication tunnel, referred to in FIG. 2 as the client based security tunnel 208. In one embodiment, the client based security tunnel 208 may be an IPSEC-based security communication tunnel between the retailer network 204 and the virtual router 202. Similarly, the virtual router 202 may communicate with a payment processing company 206 through a network. In one example, the virtual router 202 connects to the payment processing company 206 through a public network, such as the Internet. Through the public network, a secured communication tunnel, referred to in FIG. 2 as the payment processing based security tunnel 210, may be utilized to transmit communication packets between the virtual router 202 and the payment processing company 206. In one embodiment, the payment processing based security tunnel 210 may be an IPSEC-based security communication tunnel between the payment processing company 206 and the virtual router 202.

In addition to the secure communication tunnels 208,210 through networks to the retailer 204 and the payment processing company 206, the virtual router 202 may also be configured to communicate with one or more VPNs utilized by the retailer and the payment processing company. For example, the retailer network 204 may be configured as a remote access VPN that allows the retailer store locations access to the retailer network. In a similar manner, the virtual router 202 may include a client-based VPN interface 212 that allows the virtual router to access the retailer network as if the virtual router is an authorized user of the network. As such, the client-based VPN interface 212 may exchange communication packets with the retailer network 204, including abiding by the security and communication protocols utilized by the retailer network. In other words, the parameters established by the retailer for communication and access to the retailer network 204 may be abided by the virtual router 202 through the client-based VPN interface 212. By accessing the retailer network 206 as a network component through the client-based VPN interface 212, the secure transmission of packets to and from the retailer network may be maintained by the virtual router.

In a similar manner, the virtual router 202 may be configured to communicate with a VPN established over the public network with a payment processing company 206. In particular, the payment processing company 206 may create a LAN to LAN VPN that allows the payment processing company 206 to communicate securely over the public network. The virtual router 202 may include a LAN to LAN VPN interface 214 that allows the virtual router to securely communicate with the payment processing company 206. As such, the LAN to LAN VPN interface 214 may exchange communication packets with the payment processing company 206, including abiding by the security and communication protocols utilized by the payment processing company VPN. By accessing the payment processing company 206 as a network component through the LAN to LAN VPN interface 214, the secure transmission of packets to and from the payment processing company may be maintained by the virtual router 202.

Through the VPN interfaces 212,214, the virtual router 202 may act as a gateway for communication between the retailer network 204 and the payment processing company 206, perhaps for a POS transaction occurring at the retailer store. Further, it is not required that the virtual router 202 include a client-based VPN interface 212 in communication with the retailer network 204, nor to include a LAN to LAN VPN interface 214 in communication with the payment processing company 206. Rather, the virtual router 202 may include any type of VPN interface to communicate with any type of VPNs in communication with the virtual router. Further, the virtual router 202 may be utilized for other types of information transfers between entities connected to the router, other than POS transactions. In general, the virtual router 202 provides an interface or gateway between two or more VPNs to exchange information packets between the networks.

Figure 3:
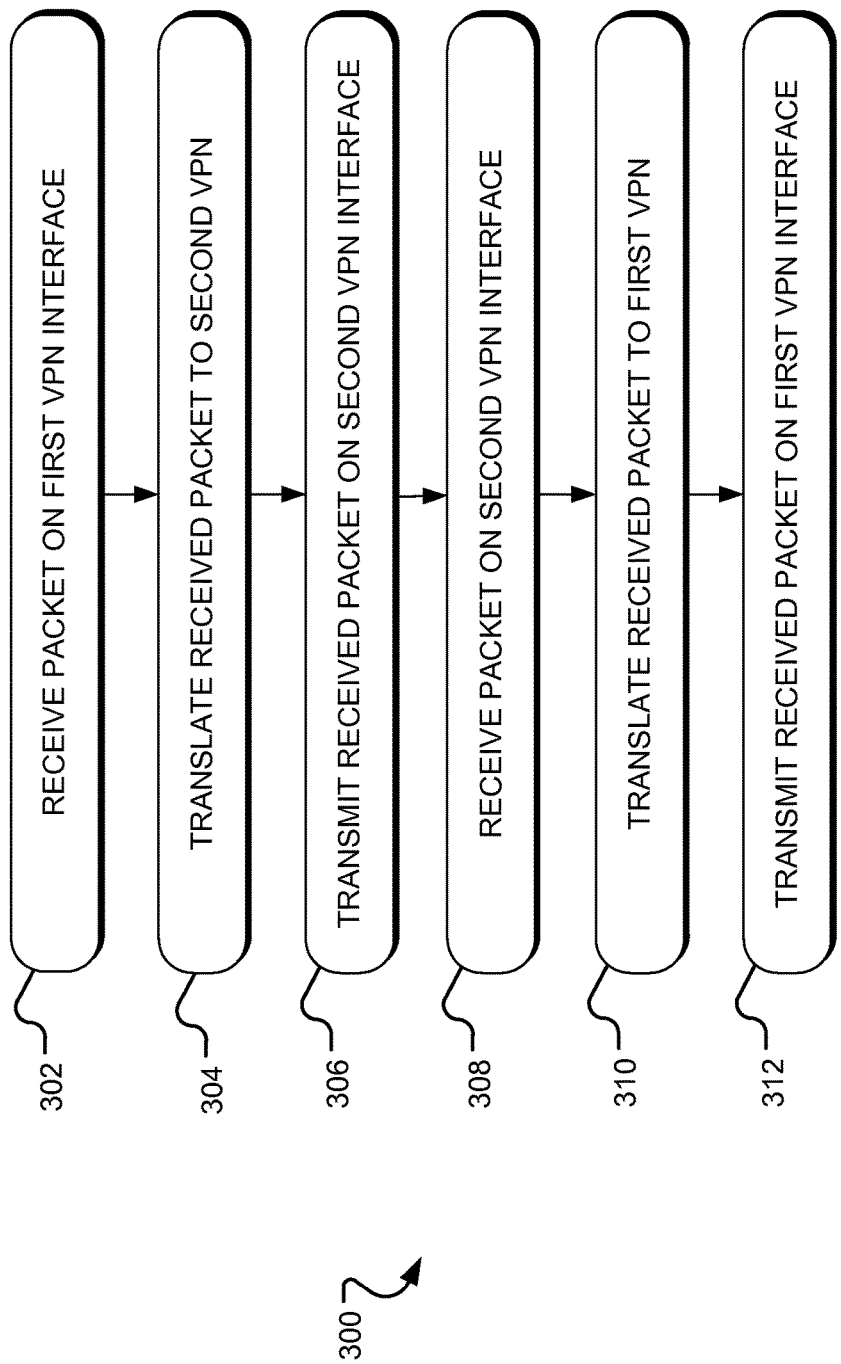
FIG. 3 is a flowchart of a method for utilizing a virtual router to create a secured end-to-end point-of-sale transaction communication path, according to one embodiment.

FIG. 3 is a flowchart of a method for utilizing a virtual router to create a secured end-to-end point-of-sale transaction communication path, according to one embodiment. In one example, the operations of the method of FIG. 3 may be performed by the virtual router during a POS transaction between a retailer and a payment processing company. The operations may be performed by the virtual router through hardware, software or a combination of hardware and software.

Beginning in operation 302, the virtual router receives a communication packet from a network connected to the first network VPN interface of the virtual router. In one particular example, the communication packet may be a request for a POS transaction from a retailer network connected to the virtual router. In operation 304, the virtual router translates the communication packet received from the first network VPN interface into a communication packet intended for a second VPN. Thus, in operation 306, the virtual router transmits the translated communication packet through a second network VPN interface of the virtual router to a second VPN connected to the router. In one example, the second VPN is maintained by a payment processing company that receives POS information from a retailer for verification of the POS transaction.

In a similar manner, the virtual router may receive communication packets from the second VPN and provide the communication to a first VPN. In particular, in operation 308, the virtual router receives a communication packet from a network connected to the second network VPN interface of the virtual router. In one particular example, the communication packet may be an acknowledgement from a payment processing company as part of a POS transaction from a retailer network connected to the virtual router. In operation 310, the virtual router translates the communication packet received from the second network VPN interface into a communication packet intended for a first VPN connected to the virtual router. In one example, the first VPN may be a retailer network that initiated the POS transaction and request to the payment processing company. Thus, in operation 312, the virtual router transmits the translated communication packet through the second network VPN interface of the virtual router to the first VPN connected to the router. In this manner, the virtual router performs the operations of FIG. 3 as a gateway between two entities, perhaps for a POS transaction between the entities.

Through the operations of FIG. 3, a virtual router may facilitate a secured end-to-end security communication tunnel (including encryption of the transmitted data) over one or more networks from an originating point of sale (retailer) to a payment processing company. In particular, because the virtual router provides a gateway that communicates with both the retailer network and the payment processing company without the need for transmitting received communications to another physical or virtual component within the datacenter, the transmitted packets between the entities may remain encrypted and secured. By maintaining the encryption and security of the transmitted communication packets between the entities, the security of the POS transaction is maintained end-to-end. This end-to-end security of the POS transaction may aid in securing the information transmitted during the transaction so that sensitive information is not obtained maliciously from a third party.

In addition to the end-to-end security provided, use of the virtual router may also provide information and performance measurements for POS transactions. For example, an administrator to the virtual router may have access to performance measurements of the virtual router. These measurements may include extracting one or more encrypted communication packets transmitted across the virtual router during the POS transaction. Through this extraction, the administrator can verify that the packets maintain encryption during transmission, thereby verifying the end-to-end security of the POS transaction. Further, the virtual router may provide information on the speed of the transaction, the number of transactions, the number of dropped or missed communication packets, and the like, by analyzing the stream of communication packets passing through the virtual router during POS transactions. This information may be analyzed and stored by the administrator to verify the operability and effectiveness of the virtual router during POS transactions.

Figure 4:
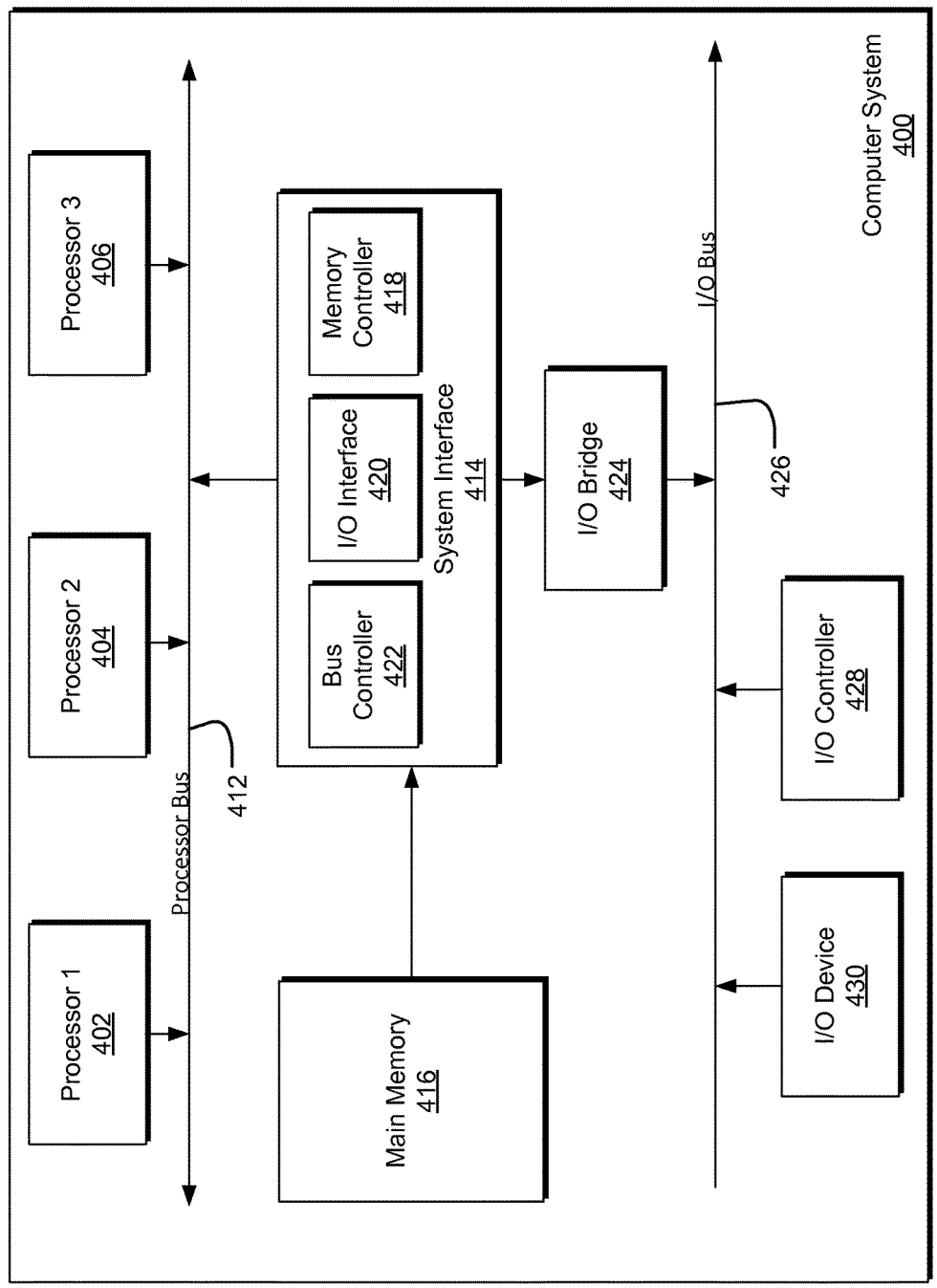
FIG. 4 is a block diagram illustrating an example of a computing system which may be used in implementing embodiments of the present disclosure, according to one embodiment

FIG. 4 is a block diagram illustrating an example of a computing device or computer system 400 which may be used in implementing the embodiments disclosed above. For example, the virtual router discussed above may be partially or fully embodied in the computing device 400 of FIG. 4. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in a non-transitory computer readable media, such as main memory 416. These instructions may be read into main memory 416 from another non-transitory computer readable media, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A non-transitory computer readable media includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIG. 3 is illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for facilitating a point-of-sale transaction, the method comprising:

receiving, at a secure gateway interface virtual device comprising a virtual router configured to maintain a secure communication tunnel between a first virtual private network (VPN) associated with a retailer and the second VPN associated with a point-of-sale authentication system and via a first VPN interface, an encrypted purchasing information communication packet comprising customer information encrypted utilizing a first security protocol of the first VPN and originating at a point-of-sale device associated with the first VPN;

translating the encrypted purchasing information communication to a second encryption utilizing a second security protocol associated with the second VPN, the second security protocol different than the first security protocol;

transmitting, to the second VPN via a second VPN interface, the translated purchasing information communication packet intended for the point-of-sale authentication system in communication with the second VPN;

receiving, from the second VPN via the second VPN interface, an encrypted acknowledgement communication packet originating from the point-of-sale authentication system and encrypted utilizing the second security protocol different than the first security protocol;

translating the encrypted acknowledgement communication packet to a first encryption utilizing the first security protocol associated with the first VPN; and transmitting, to the first VPN via the first VPN interface, the translated acknowledgement communication packet.

2. The method of claim 1 wherein the first VPN comprises a wide area network maintained by the retailer associated with the point-of-sale device.

3. The method of claim 2 wherein the first VPN comprises a first local area network (LAN) maintained by the retailer.

4. The method of claim 3 wherein the virtual router establishes a retailer-based secure communication tunnel in the wide area network to the first LAN.

5. The method of claim 2 wherein the first VPN is a remote access VPN and the virtual router communicates with the wide area network via the first VPN interface.

6. The method of claim 1 wherein the virtual router establishes a payment processing secure communication tunnel in the second VPN between the virtual router and the point-of-sale authentication system.

7. The method of claim 6 wherein the payment processing secure communication tunnel is an Internet Protocol Security (IPSEC) communication tunnel in the public network.

8. The method of claim 1 further comprising monitoring the transmission of the translated purchasing information communication packet to the second VPN and the transmission of the translated acknowledgement communication packet to the first VPN.

9. A non-transitory computer readable media comprising computer executable instructions to perform a method of facilitating a point-of-sale transaction comprising:

receiving, at a secure gateway interface virtual device comprising a virtual router configured to maintain a secure communication tunnel between a first virtual private network (VPN) associated with a retailer and the second VPN associated with a point-of-sale authentication system and via a first VPN interface, an encrypted purchasing information communication packet comprising customer information encrypted utilizing a first security protocol and originating at a point-of-sale device associated with the first VPN;

translating the encrypted purchasing information communication to a second encryption utilizing a second security protocol associated with the second VPN, the second security protocol different than the first security protocol;

transmitting, to the second VPN via a second VPN interface, the translated purchasing information communication packet intended for the point-of-sale authentication system in communication with the second VPN;

receiving, from the second VPN via the second VPN interface, an encrypted acknowledgement communication packet originating from the point-of-sale authentication system and encrypted utilizing the second security protocol;

translating the encrypted acknowledgement communication packet to a first encryption utilizing the first security protocol associated with the first VPN; and transmitting, to the first VPN via the first VPN interface, the translated acknowledgement communication packet.

10. The non-transitory computer readable media of claim 9 wherein the first VPN comprises a wide area network maintained by the retailer associated with the point-of-sale device.

11. The non-transitory computer readable media of claim 10 wherein the first VPN comprises a first local area network (LAN) maintained by the retailer.

12. The non-transitory computer readable media of claim 11 wherein the virtual router establishes a retailer-based secure communication tunnel in the wide area network to the first LAN.

13. The non-transitory computer readable media of claim 10 wherein the first VPN is a remote access VPN and the virtual router communicates with the wide area network via the first VPN interface.

14. The non-transitory computer readable media of claim 9 wherein the virtual router establishes a payment processing secure communication tunnel in the second VPN between the virtual router and the point-of-sale authentication system.

15. The non-transitory computer readable media of claim 14 wherein the payment processing secure communication tunnel is an Internet Protocol Security (IPSEC) communication tunnel in the public network.

16. The non-transitory computer readable media of claim 9 wherein the computer executable instructions further perform monitoring the transmission of the encrypted purchasing information communication packet to the second VPN and the transmission of the encrypted acknowledgement communication packet to the first VPN.

* * * * *